United States Patent Office 3,487,819
Patented Jan. 6, 1970

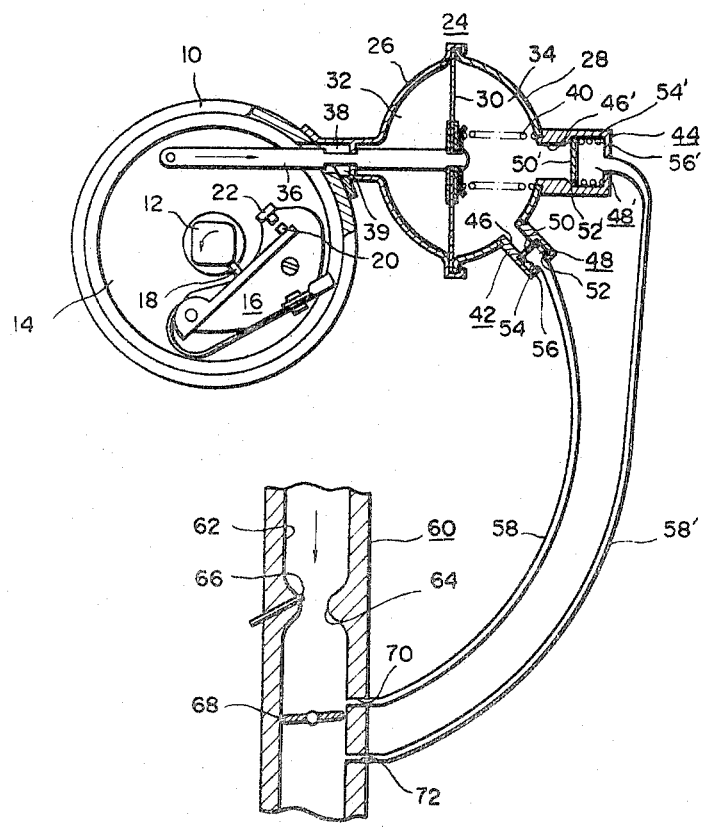

3,487,819
APPARATUS FOR CONTROLLING THE IGNITION OF AN AUTOMOBILE ENGINE
Hideo Miyazaki, Takao Miki, and Yoshitami Kashiwagi, Himeji, Japan, assignors to Mitsubishi Denki Kabushiki Kaisha, Tokyo, Japan
Filed July 27, 1967, Ser. No. 656,580
Claims priority, application Japan, July 29, 1966, 41/2,098
Int. Cl. F02p 5/10
U.S. Cl. 123—117  5 Claims

ABSTRACT OF THE DISCLOSURE

A fuel mixture supply conduit for an internal combustion engine is provided with a pair of apertures on either side of a throttle valve pivotally mounted on a traverse axis within the conduit. A pressure responsive device is divided by a flexible diaphragm into an atmospheric chamber and a vacuum chamber, the flexible diaphragm being operatively connected to distributor mechanism and the vacuum chamber being fluidly connected through valves to the apertures in the supply conduit. Depending upon the position of the throttle valve one or the other of the apertures is fluidly connected to the vacuum chamber to vary the pressure therein and flex the diaphragm to adjust the distributor mechanism.

---

This invention relates to an apparatus for controlling the ignition of an internal combustion engine in accordance with fluid pressure within a fuel mixture supply conduit for the engine.

Internal combustion engines which may be used to drive automobiles may also be used to brake automobiles as is commonly known. When the engine is operated to brake the engine, the throttle valve for the engine is turned to its substantially closed position to decrease the fuel supply to the engine, resulting in a corresponding decrease in the density of the fuel. Even if, under these circumstances, ignition does take place the resulting combustion of the fuel is not spread properly because of an insufficient amount of fuel. This results in an incomplete combustion of the fuel which contain large amounts of hydrocarbons and carbon monoxide that are exhausted into the air through the associated exhaust pipe, resulting in an undesirable contamination of the air.

Accordingly, it is an object of the present invention to eliminate any incomplete fuel combustion that results when an automobile engine operates as an engine brake, thereby to decrease contamination of the ambient atmosphere.

It is another object of the present invention to provide a new and improved apparatus for controlling the ignition of an internal combustion engine automatically to advance the ignition timing when the engine is operating as an engine brake.

It is still another object of the present invention to provide a new and improved apparatus for controlling the ignition timing of an internal combustion engine automatically to advance the ignition time in accordance with the load exerted on the engine.

Briefly, the invention accomplishes the above cited objects by the provision of a system for controlling the ignition timing of an internal combustion engine, comprising a throttle valve disposed in a fuel mixture supply conduit for the engine, first means communicating with that side of said throttle valve which is remote from the engine side of the conduit, i.e., the air intake side, when the valve is in its substantially closed position, to sense a fuel pressure in the conduit on the air intake side of the throttle, and second means communicating with the engine side of the throttle valve as to sense a fuel pressure in the conduit on the engine side, the arrangement being such that in operation a fuel pressure sensed by the second means is effective for advancing the ignition timing when the throttle valve is in its substantially closed position while a fuel pressure sensed by the first means is effective for advancing the ignition time when the throttle valve is in its open position.

The present invention will become more readily apparent from the following detailed description when considered in conjunction with the accompanying drawing in which a single figure is a schematic front elevational view, partially in section of a control device constructed in accordance with the teachings of the present invention.

Referring now to the drawing, it is seen that within a distributor housing 10 a cam 12 is rigidly secured on a distributor shaft (not shown) and an apertured support or breaker plate 14 having a centrally located aperture in which the cam 12 is rotatable in one or the other direction about the axis of the cam 12. The distributor shaft is adapted to be driven in the direction of the arrow by an associated internal combustion engine through a gearing not illustrated in the drawing. Mounted on the support plate 14 is a circuit breaker 16 including a cam follower or rubbing block 18 slidably engaging the cam 12 and a movable contact 20 controlled by the cam 12 through the cam follower 18 to move the contact 20 into and out of contact with a stationary contact 22. When the movable contact 20 contacts the stationary contact 22 a primary winding of an ignition coil (not shown) is energized by a battery (not shown) but when the movable contact 20 moves out of contact with the stationary contact 22 an ignition voltage is generated across an ignition secondary winding to ignite one of the combustion chambers in the engine. The above mentioned components are of conventional construction and need not be further described.

According to the teachings of the present invention a pressure responsive device generally designated by the reference numeral 24 is disposed externally of but adjacent to the distributor housing 10. The pressure responsive device 24 comprises a housing that includes a pair of bowl-shaped members 26 and 28 connected together as a unitary structure by a caulk arrangement with the open ends facing each other, and a flexible diaphragm 30 sandwiched between the open bowl ends to divide the interior into an atmospheric chamber 32 communicating with the air and a pressure or vacuum chamber 34. A control rod 36 extends from the center of the diaphragm 30 through the atmospheric chamber 32 into the distributor housing 10 for limited longitudinal or endwise movement. The control rod 36 is connected at its other end to the support plate 14 and serves to rotate the support plate 14 about the axis of the cam 12. In order to permit the control rod 36 to effect a limited longitudinal movement, the same includes a portion 38 of reduced diameter intermediate both ends and adapted loosely to extend through an aperture in a wall of the atmospheric chamber 32 which serve as a rod stop 39. Further a compression spring 40 is disposed within the pressure chamber 34 to counteract the longitudinal movement of the control rod 36.

On the other hand, the pressure chamber 34 is provided on its wall with a pair of spaced pressure introducing units in the form of a short pipe generally designated by the reference numerals 42 and 44. The pressure introducing unit 42 includes a pressure introducing port 46 opening into the pressure chamber 32 at one end and a control valve 48 mounted in the other end portion. The valve 48 includes a valve body 50 movably disposed within a valve port 52 provided on its inner surface with a plurality of longitudinal grooves 54 and a compression spring 56 serving normally to bias the valve body 50 toward its closed position. The second pressure introducing unit 44 is identical in construction to the first unit 42 and the same reference numerals are primed to designate the components corresponding to those of the first unit. The valve 48 or 48' has connected to that side thereof opposite to the valve body 50 or 50' a connecting or fuel mixture supply conduit 60, 58 or 58' leading to a feed fuel pipe for an automobile engine (not shown).

In the drawing the reference numeral 60 generally designates a part of a carburetor schematically shown as a section of a conduit and serving to vaporize a fuel supplied to the engine (not shown). The carbureter 60 includes a passage 62 for forcing air through its interior in the direction of the arrow, a venturi portion 64 where a nozzle 66 for injecting a fuel is open and a throttle valve 68 controlled by an accelerator pedal (not shown). The throttle valve 68 is pivotally mounted within the conduit 60 on an axis extending transversely of the conduit.

According to the teachings of the invention the fuel mixture supply conduit 60 is provided with a first and second pressure sensing unit preferably in the form of an aperture extending through its wall on both sides of the throttle valve 68 as in its minimum open position. More specifically the first pressure sensing unit or aperture 70 is positioned on the air intake side or upstream of the throttle valve 68 with respect to a flow of fuel or on that side thereof which in the valve substantially closed position as shown is remote from the associated engine (not shown). The second pressure sensing unit or aperture 72 is positioned downstream of the throttle valve 68, i.e. the engine or low pressure side thereof. As can be understood from the drawing the throttle 60 is always positioned above the aperture 72 regardless of the position of the throttle as it pivots on its axis in response to depression of the accelerator pedal, i.e., aperture 72 is beyond the range of the throttle 60 in any open position of the throttle. The first and second apertures 70 and 72 communicate with the first and second control valves 48 and 48' through the connecting pipes or conduits 58 and 58' respectively.

The arrangement thus far described is operated as follows: assuming that the associated engine (not shown) is in its normal operation in which the associated accelerator pedal (not shown) is depressed to open the throttle valve 68 from its minimum open position (or putting it another way, its substantially closed position) through a range of increasingly open positions to an open position determined by the amount of the depression of the accelerator. Under the assumed conditions, both pressure sensing units 70 and 72 will sense negative pressures of a fuel less in absolute magnitude than a predetermined negative pressure $P_1$ which may be normally in the order of 400 mm. Hg. In other words, the first sensing unit 70 is designed to sense a negative fuel pressure ranging from 0 to approximately 400 mm. Hg while the second sensing unit is designed to sense a negative fuel pressure ranging from approximately 500 to 700 mm. Hg. The negative pressures thus sensed are transmitted to the first and second control valves 48 and 48' through the connecting pipes 58 and 58' respectively.

According to the teachings of the present invention the spring 56 in the first control valve 48 is so weak that the valve body 50 can respond to the low negative pressure as above described and be moved against the action of the spring so as to open the valve. However, the spring 56' in the second control valve 48' is strong enough to prevent any negative pressure less in absolute magnitude than the predetermined negative pressure $P_1$ from moving the valve body 50' to open the valve against the action of the spring. Under these circumstances, the negative pressure sensed by the first pressure sensing unit 70 is transmitted to the pressure chamber 34 through the grooves 54 of the now open valve 48. Also after the first control valve 48 has been opened the pressure on both sides of the valve body 50 are equal to each other. This cooperates with the strong spring 56' to ensure that the second control valve 48' remains closed thereby to prevent the negative pressure sensed by the second unit 72 to be transmitted to the pressure chamber 34.

Thus it will be appreciated that the pressure chamber 34 is subject to the low negative pressure transmitted thereto through the now open valve 48. This pressure varies dependent upon the degree to which the throttle valve 68 is opened and therefore with the load on the associated engine (not shown). Accordingly a pressure difference is developed between the atmospheric and pressure chamber 32 and 34 respectively. This causes the diaphragm 30 and therefore the control rod 36 to be moved in the direction of the arrow thereby to rotate the support plate 14 about the axis of the rotating cam 12 in a direction reversed from the direction of rotation of the latter with the result that the ignition timing advances in proportion to the particular load on the engine.

With the engine operated as an engine brake, the throttle valve 68 is adjusted to its minimum open position as shown and permits air and fuel to pass therethrough in small amounts. Under these circumstances, the first pressure sensing unit 70 will sense a pressure substantially equal to the atmospheric pressure while at the same time the second pressure sensing unit 72 will sense a negative pressure higher in absolute magnitude than a predetermined negative pressure $P_2$ where $P_2$ is higher in absolute value than $P_1$ and may normally be in the order of 500 mm. Hg. The second pressure sensing unit 72 is operable to sense a negative pressure ranging from approximately 500 to 700 mm. Hg. The negative pressure higher than the predetermined negative pressure and sensed by the second sensing unit 72 is applied through the connecting pipe 58' to the second control valve 48' to open it while the pressure substantially equal to the atmospheric pressure and sensed by the first sensing unit 70 is applied through the connecting pipe 58 to the first control valve 48, which is ineffective in opening the valve 48. Thus, the first valve 48 remains closed.

Thus, it will be appreciated that the negative pressure (which is higher than the predetermined negative pressure $P_2$) sensed by the second sensing unit 72 is transmitted to the pressure chamber 34 through the grooves 54' of the now open control valve 48'. As in the normal operation previously described, a pressure difference is developed between the atmospheric and pressure chamber 32 and 34 but greater than that occurring in the previous case. That pressure difference causes the diaphragm 30 and therefore the control rod 36 to be moved in the direction of the arrow to rotate the support plate 14 about the axis of the rotating cam 14 in the direction opposite to the direction of rotation of the latter with the result that the ignition timing is again advanced. However, as the control rod 36 has effected greater longitudinal movement than in the normal operation of the engine the resulting advanced angle for ignition is substantially greater than in the previously described case.

Under these circumstances, a fuel-air mixture is ignited within the respective engine cylinders sufficiently far in advance of the point in the cycle that the associated piston will have reached its upper dead point to provide a sufficient period of time. Therefore, a fuel, if low in density, within the engine cylinders is allowed to be completely burned resulting in a substantial decrease in the amount of harmful gases and impurities such as hydrocarbon and carbon monoxide which are directed to the ambient atmosphere through the automobile exhaust pipe.

It is here noted that the first control valve 48 remains closed to prevent the fuel from flowing from the first pressure sensing aperture 70, through the first pressure introducing unit 42, the pressure chamber 34 and the second pressure introducing unit 44 into the second pressure sensing aperture 72 shunting the throttle valve 68.

From the foregoing it will be appreciated that the present apparatus is effective for not only advancing the ignition timing in accordance with the load on the associated engine during its normal operation but also advancing it further when the engine is utilized as an engine brake thereby preventing the fuel from being incompletely burned. This prevents any contamination of the air due to incomplete combustion of the fuel. Also the use of a single diaphragm 30 makes it possible to provide an advance angle for ignition in accordance with the load on the associated engine and also provides a larger advance angle for ignition, the engine is utilized as an engine brake for the purpose of preventing incomplete combustion of the fuel. This measure eliminates the necessity of providing a separate pressure responsive device or separate diaphragm for providing a large advance angle for ignition to prevent any incomplete combustion of the fuel when the engine is utilized as an engine brake. Thus, the present invention provides an ignition control system very simple in construction and inexpensive to manufacture.

While the invention has been illustrated and described in conjunction with a preferred embodiment thereof it is to be understood that various change and modification may be made without departing from the spirit and scope of the invention.

What we claim is:

1. An apparatus for controlling the ignition timing of an internal combustion engine comprising: a fuel mixture supply conduit for supplying a fuel mixture at varying pressures, a throttle valve mounted in said conduit to pivot on an axis extending transversely of said conduit, said throttle valve having a substantially closed idling position and a range of open positions and having an engine side and an air intake side when in said substantially closed idling position, said conduit including a first aperture disposed upstream from the air intake side of said throttle valve when said throttle valve is in said substantially closed idling position and a second aperture continuously disposed downstream from the engine side of said throttle valve regardless of the position thereof, a pressure responsive device for controlling the ignition timing of an internal combustion engine first pressure-responsive valve means interconnecting said pressure-responsive device and said first aperture for actuating said pressure responsive device in response to the pressure of said fuel mixture when said throttle valve is in said range of open positions and second pressure responsive valve means interconnecting said pressure responsive device and said second aperture for actuating said pressure responsive device in response to the pressure of said fuel mixture downstream of said throttle valve when said throttle valve is in said substantially closed idling position.

2. An apparatus as set forth in claim 1; wherein said pressure responsive device includes a housing, a flexible diaphragm mounted within said housing to divide said housing into an atmospheric chamber and a vacuum chamber, said housing having first and second outlets leading from said vacuum chamber, said first outlet connected to said first pressure-responsive valve means and said second outlet connected to said second pressure-responsive valve means.

3. An apparatus as set forth in claim 2; wherein said first pressure-responsive valve means includes a first movable valve member and a first spring tending to exert pressure to bias said first valve member to a closed position blocking fluid communication between said first aperture and said vacuum chamber, and said second pressure-responsive valve means includes a second movable valve member and a second spring tending to exert substantially more pressure on said second valve member than the pressure that said first spring exerts on said first valve member, whereby when said throttle valve is in said substantially closed position, said second valve member is opened to provide communication between said fuel mixture supply conduit and said vacuum chamber and when said throttle valve is moved from said substantially closed position to an open position, said second valve member is closed and said first valve member is opened to provide communication between said fuel mixture supply conduit and said vacuum chamber.

4. An apparatus as set forth in claim 3; where in said pressure responsive device is connected to a distributor mechanism, and wherein said distributor mechanism includes a rotatably mounted breaker plate, a fixed contact fixedly mounted on said breaker plate and a movable contact movably mounted on said breaker plate and spaced from said fixed contact, means for periodically moving said movable contact into contact with said fixed contact, a rod secured at one end section to said flexible diaphragm and at its other end section to said rotatable breaker plate, whereby when said pressure responsive device is actuated said flexible diaphragm is moved thereby to rotate said breaker plate.

5. An apparatus as set forth in claim 1; wherein both said first and second apertures are positioned on the same side of said fuel mixture supply conduit.

References Cited

UNITED STATES PATENTS

| 2,274,316 | 2/1942 | Arthur | 123—117.1 |
| 3,329,136 | 7/1967 | Cadiou | 123—117.1 |

WENDELL E. BURNS, Primary Examiner

U.S. Cl. X.R.

123—97